United States Patent [19]

Birke et al.

[11] 4,194,881
[45] Mar. 25, 1980

[54] PROCESS FOR THE DYEING OR PRINTING OF POLYESTER FIBERS

[75] Inventors: Walter Birke; Hans-Ulrich von der Eltz; Franz Schön, all of Frankfurt am Main, Fed. Rep. of Germany

[73] Assignee: Hoechst Aktiengesellschaft, Frankfurt am Main, Fed. Rep. of Germany

[21] Appl. No.: 903,007

[22] Filed: May 4, 1978

[30] Foreign Application Priority Data

May 7, 1977 [DE] Fed. Rep. of Germany ....... 2720585

[51] Int. Cl.$^2$ .................... C09B 27/00; D06P 1/02
[52] U.S. Cl. .................... 8/41 B; 8/41 C; 8/94 A
[58] Field of Search .................... 8/41 B, 41 C, 94 A

[56] References Cited

U.S. PATENT DOCUMENTS

| 3,988,109 | 10/1976 | Schuierer | 8/94 R |
| 3,993,441 | 11/1976 | Heinrich et al. | 8/21 C |
| 4,121,899 | 10/1978 | Chambers et al. | 8/94 A |
| 4,134,723 | 1/1979 | Boyd et al. | 8/41 C |

FOREIGN PATENT DOCUMENTS

| 2612741 | 10/1976 | Fed. Rep. of Germany . |
| 2262713 | 10/1975 | France . |
| 792210 | 3/1958 | United Kingdom . |

OTHER PUBLICATIONS

Colour Index (Third Edition), vol. 2, 1971, p. 2530; C. I. Disperse Yellow 119.

*Primary Examiner*—A. Lionel Clingman
*Attorney, Agent, or Firm*—Curtis, Morris & Safford

[57] ABSTRACT

In the process for the pad-dyeing or printing of materials consisting of, or containing, polyester or polyamide fibers or filaments, whereat in known manner the said materials are padded or printed with an aqueous liquor or printing paste of disperse dyestuffs, and subsequently the dyestuffs are fixed by means of liquid or gaseous methylene chloride or of both of the said phases of methylenechloride, the improvement that a dyestuff of the formula

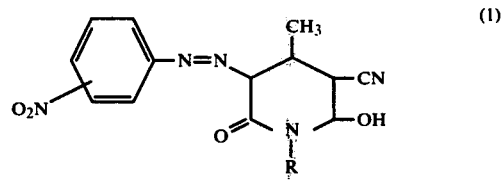

(1)

in which R represents a hydrogen atom or an alkyl group of 1 to 4 carbon atoms, is applied.

1 Claim, No Drawings

PROCESS FOR THE DYEING OR PRINTING OF POLYESTER FIBERS

The present invention relates to a process for the dyeing or printing of polyester fibers.

From German Auslegeschrift No. 2,433,662 a process for the dyeing and finishing of textile goods has already been known, according to which a solution or dispersion of a dyestuff or chemical agent appropriate for application is applied onto the textile goods which are subsequently subjected to the action of air enriched with a halogenated hydrocarbon having a temperature of about 30° C. at a maximum, for the purpose of dyestuff fixation. This process comprises applying the dyestuff and/or chemical agent in an aqueous solution or dispersion onto the textile goods and then exposing the latter to an air current which has been enriched with methylene chloride.

From German Patent Specification No. 1,040,501 a process for the dyeing of textile goods of synthetic fibers has been known, according to which the textile goods are passed first through an aqueous solution of the dyestuff and are then heated in order to eliminate water. Subsequently, the textile goods are exposed to the saturated vapor of methylene chloride for the fixation of the dyestuff, in which process the methylene chloride is condensed.

Furthermore, a process for the pad-dyeing or printing of materials consisting of, or containing, polyester or polyamide fibers or filaments has been proposed, in which process aqueous baths and/or printing pastes of disperse dyestuffs are applied in common manner onto the materials, and the dyestuffs are then fixed by a treatment with methylene chloride. This process comprises bringing the padded or printed and optionally dried material into a close contact with an accompanying material containing methylene chloride, or bonding said material on one side with an accompanying material which is then moistened with methylene chloride, and thereafter allowing the material to dwell in either case at a temperature of up to 41° C.

According to another process proposed, in which aqueous baths and/or printing pastes of diperse dyestuffs are also applied in common manner onto materials of polyester or polyamide fibers or filaments, the fixation of the dyestuffs is effected by applying methylene chloride in a liquid form onto the padded or printed and optionally dried material by way of spraying, sprinkling, foaming, padding, or by means of rollers or brushes.

All these processes show a common process step, namely that the dyestuff fixation is effected in the presence of methylene chloride (or probably by the methylene chloride), the methylene chloride being present in the liquid and/or gaseous phase.

It has now been found that materials which consist of, or contain, polyester or polyamide fibers or filaments can be pad-dyed or printed, in which process the materials are padded and/or printed in common manner with aqueous baths and/or printing pastes of disperse dyestuffs, and subsequently the dyestuffs are fixed by the action of liquid and/or gaseous methylene chloride, by using dyestuffs of the general formula

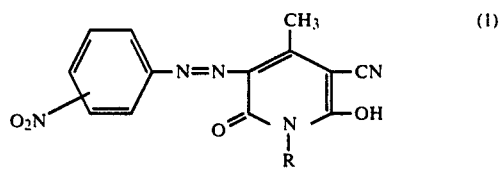

in which R represents a hydrogen atom or an alkyl group having from 1 to 4 carbon atoms.

For the dyeing processes comprising the dyestuff fixation on polyester fibers in the presence of methylene chloride, the experiences made through processes for the dyeing of polyester of the common kind are not applicable in any manner. Thus, for example, only an insufficient dyestuff yield is obtained in particular with the dyestuffs of the formulae

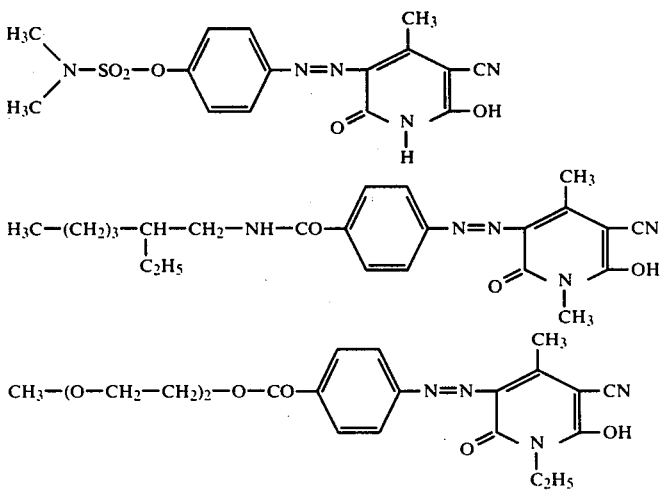

although these dyestuffs lead to very good dyestuff yields in accordance with the conventional processes (i.e. without fixation in the presence of methylene chloride).

Of the dyestuffs according to formula 1, the dyestuffs of the following formulae are particularly suitable:

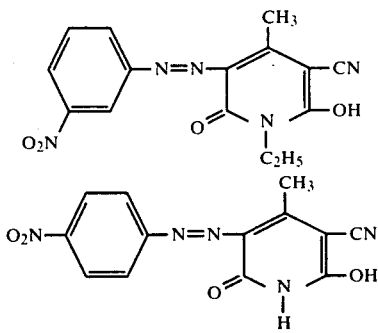

The following Examples serve to illustrate the invention.

EXAMPLE 1

A fabric of texturized polyester fibers is padded on a padder at room temperature with a liquor pick-up of 90% with an aqueous bath which contains per liter 20 g of the dyestuff of the formula

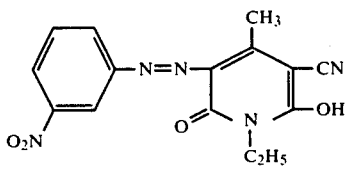

and 1 g of a commercial wetting agent.

Subsequently, the padded wet fabric is passed for 1 minute through a chamber filled with methylene chloride vapor. After the condensation has been completed, the material is wound up. Thereafter, the material is allowed to dwell for 3 hours at room temperature in a closed container or in a sheet which is not permeable for methylene chloride and is then subjected to an after-treatment in common manner.

The yellow dyeing obtained shows the fastness properties which are characteristic of the dyestuff used.

EXAMPLE 2

A fabric of texturized polyester fibers is padded on a padder at room temperature with a liquor pick-up of 90% with an aqueous bath which contains per liter 20 g of the dyestuff of the formula

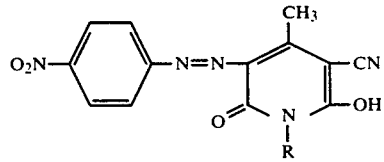

and 1 g of a commercial wetting agent.

At the same time a cotton fabric is padded with methylene chloride. Both fabrics are wound up together. Subsequently, they are allowed to dwell for 4 hours at room temperature.

Following an after-treatment that is common for polyester fibers, a yellow dyeing is obtained which shows the fastness properties that are characteristic of the dyestuff used.

EXAMPLE 3

A textile material of texturized polyester filaments is impregnated with an aqueous dyestuff liquor which contains 30 g/l of the dyestuff mentioned in Example 1.

The impregnated material is wound up on a perforated cylinder, in which process air enriched with methylene chloride is passed through the material roll. Following a treatment period of 3 hours at room temperature, the material is treated with water vapor, and the dyeing is completed as usual by rinsing and drying.

A yellow dyeing is obtained which shows good fastness properties.

EXAMPLE 4

A fabric of polyester staple fibers is printed with a printing paste which contains the following components per kilogram:

15 Grams of the yellow dyestuff mentioned in Example 2, 911 g of water, 50 g of a sodium alginate, 16 g of a starch ether, 6.7 g of a water softening agent on the basis of polyphosphate, and 1.3 g of citric acid.

In order to fix the dyestuff, the printed goods are processed according to the method described in Example 2 including the common reductive after-treatment (purification).

A print is obtained which shows the fastness properties which are characteristic of the dyestuff used.

EXAMPLE 5

The process is carried out according to the method described in Example 1, however, with the difference that a car safety belt of polyester filaments of high tenacity is padded and allowed to dwell, following the winding-up, for 3 hours in the dwelling chamber at a temperature of from 40° to 41° C., while being turned. An even yellow dyeing is obtained with an excellent penetration of the dyestuff.

Besides, a shrinkage of about 20% is obtained, which corresponds to the common values reached in thermal processes (as in a one-minute treatment with hot air at a temperature in the range of from 200° to 210° C.).

EXAMPLE 6

A cross-wound bobbin (600 g) of polyester staple fiber yarn is impregnated on a laboratory dyeing apparatus with a bath which contains per liter of water 30 g of the dyestuff described in Example 1.

Subsequently, the cross-wound bobbin is centrifuged, until it contains a residual amount of water of 30%, and is then placed onto a perforated material carrier. Thereafter, air enriched with methylene chloride is passed through the bobbin at room temperature, and the material is allowed to dwell in this state for 4 hours.

The yellow dyeing obtained is completed by a common alkaline reductive after-treatment. A bobbin showing an unobjectionable penetration of the dyestuff is obtained. The dyeing shows the fastness properties which are characteristic of the dyestuff used.

We claim:

1. In the process for the pad-dyeing or printing of materials consisting of, or containing, polyester or polyamide fibers or filaments, whereat in known manner the said materials are padded or printed with an aqueous liquor or printing paste of disperse dyestuffs, and subsequently the dyestuffs are fixed by means of liquid or gaseous methylene chloride or of both of the said phases of methylene chloride, the improvement that a dyestuff of the formula
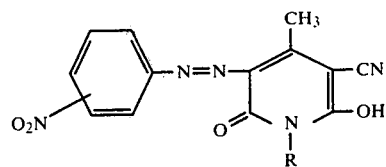
in which R represents hydrogen or an alkyl group of 1 to 4 carbon atoms, is applied.